(No Model.)
F. W. SEABURY.
DENTAL FLASK.
No. 279,605. Patented June 19, 1883.
Fig. 1.
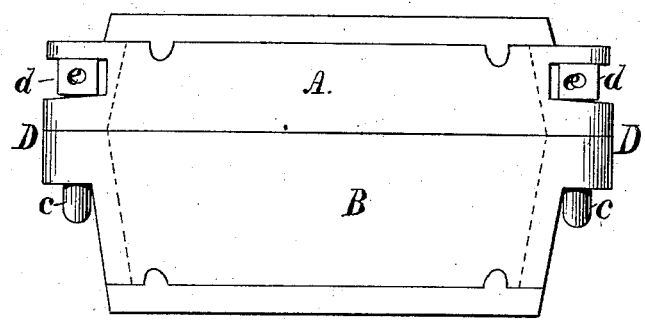
Fig. 2.
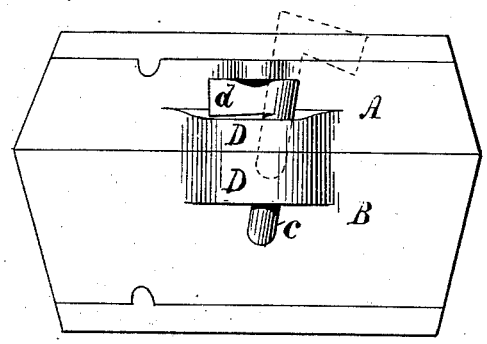
Fig. 3. Fig. 4. Fig. 5. Fig. 6.
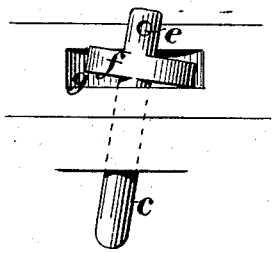  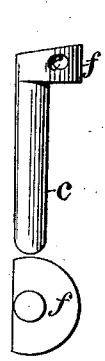 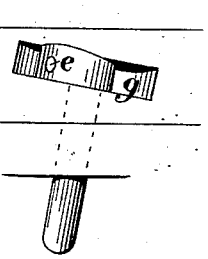
WITNESSES:
J. F. Boans.
C. H. Leuthi Jr.
INVENTOR:
Frederick W. Seabury
by Joseph A. Miller & Co
Attys

UNITED STATES PATENT OFFICE.

FREDERICK W. SEABURY, OF PROVIDENCE, RHODE ISLAND.

DENTAL FLASK.

SPECIFICATION forming part of Letters Patent No. 279,605, dated June 19, 1883.

Application filed April 7, 1883. (No model.)

*To all whom it may concern:*

Be it known that I, FREDERICK W. SEABURY, of the city and county of Providence, and State of Rhode Island, have invented a new and useful Improvement in Dental Flasks; and I hereby declare the following to be a full, clear, and exact description of the same, reference being had to the accompanying drawings, forming part of this specification.

This invention has reference to an improvement in dental flasks; and it consists in the peculiar and novel construction of the dowel-pins or guides, by which the same can be quickly removed and the flask opened, as will be more fully set forth hereinafter.

In vulcanizing the gums and securing the teeth, the flask in which they are subjected to heat is made in two parts; the cope or upper part being guided obliquely by means of dowel-pins secured to the nowel or lower part of the flask. When the flask is to be separated to remove the gum with the teeth, the two parts require to be free to move in any desired direction. It is therefore necessary to remove the oblique guides. It is desirable to do this without turning or moving the lower part of the flask, and for this purpose I construct the dowels or guides so that they can be secured and released by a partial rotation of the same.

Figure 1 is a side view of a dental flask provided with my improved dowel-pins or guides. Fig. 2 is an end view of the flask, showing the oblique direction of the guide-pins secured in place, and indicating in broken lines the manner of removing the same. Fig. 3 is a view of a pin secured in a slot cut in the flask. Fig. 4 is a side view of the pin and an end view of the same. Fig. 5 is a side view and end view of a modified form of pin, and Fig. 6 is a view showing its application to a flask.

In the drawings, A and B are the two parts of a dental flask. C is an oblique guide-pin inserted into holes formed in the projections D on the flask, so that on bringing the two parts together the upper part will move obliquely until it rests on the lower part. When, now, the flasks are to be separated, the guide-pins have to be removed, and for this purpose they are provided either with the arm $d$ or with a cam-shaped projection, $f$, that can be turned into the slot $g$, made in the flask, as is shown in Figs. 3 and 6, or under a projection, as is shown in Figs. 1 and 2. These arms or cams may be provided with the holes $e$, so that a pin may be inserted to turn the guides more readily, the object being to secure the guide-pins by a partial rotation and release the same quickly in the same manner. By this arrangement the lower part of the flask can remain in the vulcanizer and the upper part be readily removed, when, the guide-pins being again secured, a new set of gums and teeth is inserted, and the cope pressed down obliquely, as is more fully described in the Patent No. 271,370, granted to me January 30, 1883, in which the guide-pins are shown secured by screw-threads, which I find difficult to manage, as the flask has to be reversed to withdraw the same, and considerable time is required to unscrew the guides, the present invention being an improvement on the invention described in the patent above referred to.

Having thus described my invention, I claim as new and desire to secure by Letters Patent—

1. The combination, with a dental flask, of the detachable guide-pins C, provided with a locking device constructed to secure the pins or release the same by the partial rotation of the pin, as described.

2. The combination, with the flask A B, of the oblique guide-pins C, provided with the arm $d$ or cam $f$, constructed to secure the pin or release the same by a partial rotation of the pin, as described.

FREDERICK W. SEABURY.

Witnesses:
M. F. BLIGH,
J. A. MILLER, Jr.